United States Patent Office 3,555,789
Patented Jan. 19, 1971

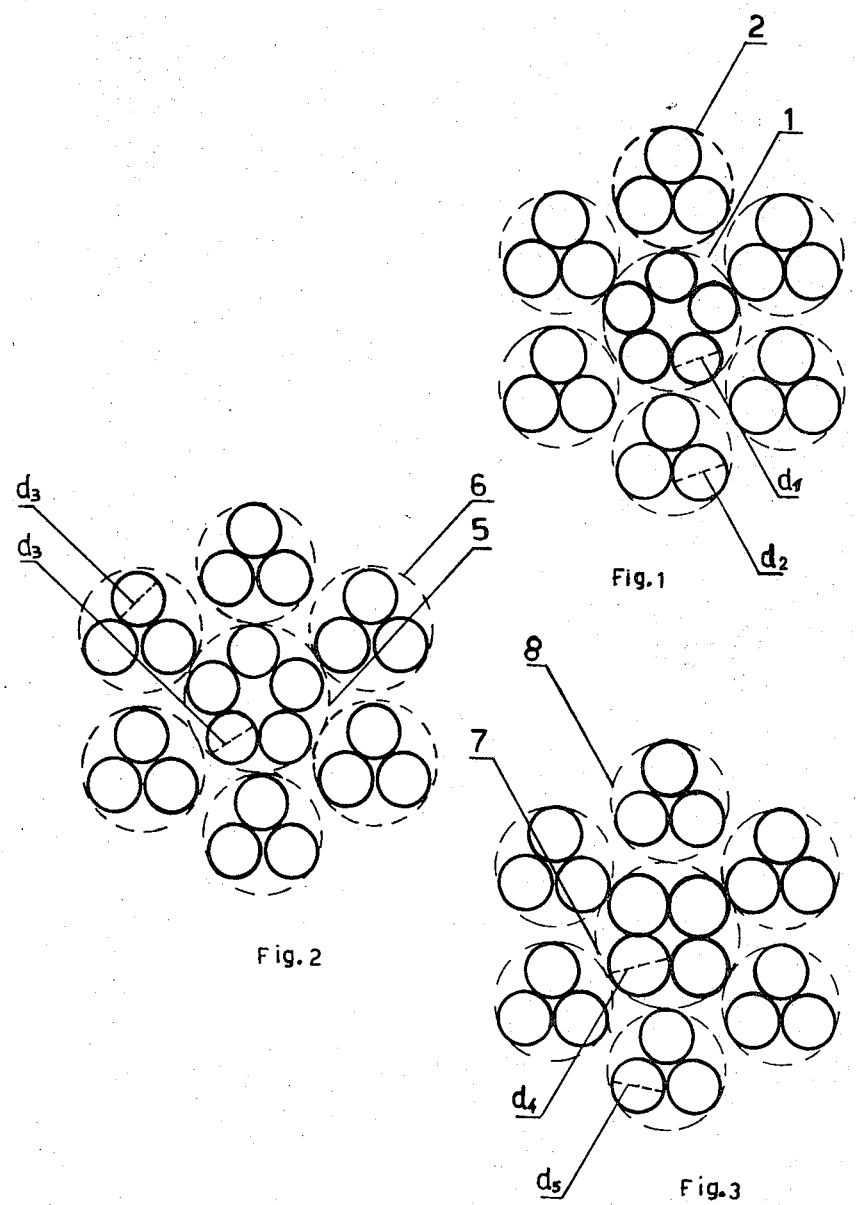

3,555,789
REINFORCING METAL CORDS
Pietro Terragna, Figline Valdarno, Italy, assignor to Pirelli, Societa per Azioni, Milan, Italy
Filed Feb. 10, 1969, Ser. No. 798,194
Claims priority, application Italy, Feb. 12, 1968, 12,640/68
Int. Cl. D02g 3/48; D07b 1/10
U.S. Cl. 57—145        3 Claims

ABSTRACT OF THE DISCLOSURE

Metal cords for use as reinforcing members in elastomeric articles, such as automobile tires, hoses, etc., comprising a multiple-wire core strand surrounded by a plurality of multiple-wire outer strands.

---

The present invention relates to metal cords, to be used in particular as reinforcing elements in articles made of elastomeric or plastic material, as pneumatic tires, conveyor and driving belts, reinforced hoses and the like.

As known, a widely used type of metal cord—to which the present invention refers in particular—consists of a central core formed of metallic elements (one individual wire or three wires stranded together) and of at least an outer layer generally consisting of six metallic elements as defined above, in contact with one another and disposed around the central core.

These cords are built up in such a way as to comply with definite requirements, depending upon the use for which they are intended; in particular, when used in pneumatic tires, they must possess a high fatigue resistance in order to be able to withstand repeated tension, compression, and bending stresses.

As is known, the life of a metal cord depends on the mutual abrasion between the individual elements constituting it; consequently, it is necessary to maintain this phenomenon within reasonable limits, and this can be done in different ways, for instance by reducing to the minimum value the angle of contact of the various elements. However, the most common recourse is that of providing maximum penetration between the elements of elastomeric material in order to separate the elements from one another and to prevent relative sliding and abrasion therebetween.

In order to facilitate said penetration, it has been proposed to form the central core of the cord with a strand, the metal wires of which are equal in number to those of the strands forming the outer layer, but have a greater diameter than that of the outer strand wires, so that the strands of the outer layer are in contact with the central core, but not in contact with one another.

Applicant has now found it possible to build up a metal cord which, besides complying with the requirement of good penetration of the elastomeric material between the individual components constituting it, possesses, relative to said conventional cords, a higher fatigue resistance.

The object of the present invention is, therefore, a reinforcing metal cord to be used in articles made of elastomeric or plastic material, in particular pneumatic tires, which comprises a central core formed by a strand of metal wires and an outer layer made of six strands of metal wires, said strands being separated from one another but being in close contact with the central core, characterized in that the strand forming the central core is made of metal wires whose diameter ranges between 0.12 and 0.25 mm., the central core metal wires being greater in number than the number of wires in the strands forming the outer layer.

A further object of the present invention is a reinforced structure, made of elastomeric or plastic material, comprising the above described metal cord.

According to the invention, the central core of the cord is constituted by a strand made of more than three metal wires, the strands of the outer layer being each constituted by three metal wires stranded together.

The wires constituting the strand of the central core have a very small diameter, whose value is within the above indicated range; said value can be of the same order as, or smaller than, that of the wires forming the outer layer.

Obviously, the expression—diameter of the same order —means that the metal wires of the central core of the cord can have a diameter equal to, or slightly greater than, that of the metal wires forming the outer layer.

The use of metal wires of small diameter results in a higher flexibility of the central core of the cord in spite of the large number of wires constituting it, and in a consequent improvement of the fatigue resistance of the cord.

The metal cords according to the present invention comprise an outer layer constituted by strands which are spaced apart at a certain interval, but which are in close contact with the wires forming the central core; therefore, it is possible to obtain maximum penetration of the elastomeric or plastic material to as far as the central core during the curing or cross-linking of the reinforced structure built up in this way.

The present invention will be more clearly understood with reference to FIGS. 1, 2, and 3, which respectively represent by way of example the cross sections of respective metal cords built up in accordance with the principle of the present invention.

In particular, FIG. 1 illustrates in cross section a metal cord, whose central core 1 is constituted by a strand of five wires having a diameter $d_1$ of the order of 0.2 mm. and whose outer layer 2 is constituted by six strands of three wires having a diameter $d_2$ of the order of 0.22 mm.

FIG. 2 represents in cross section a metal cord, in which the central core 5 is made of five wires having a diameter $d_3$ of 0.22 mm. and the outer layer 6 is made of six strands of three wires also having a diameter $d_3$, equal to that of the wires of the central core.

FIG. 3 represents in cross section a metal cord in which the central core 7 is made of four wires having a diameter $d_4$ of the order of 0.24 mm. and the outer layer 8 is made of six strands of three wires having a diameter $d_5$ of the order of 0.22 mm.

It is understood that the present invention is not restricted to the herein illustrated embodiments, but that it is applicable to any other embodiment of cords constructed in accordance with the herein disclosed inventive concept.

What is claimed is:

1. A reinforcing metal cord suitable as a reinforcement for elastomeric articles and which comprises a central core formed by a strand of metal wires which is circumscribed by an outer layer consisting of six strands of metal wires, each of the outer layer strands consisting of three metal wires and the core strand comprising a number of metal wires greater than three, the core strand wires having a diameter of between 0.12 and 0.25 mm., the outer layer strands being separated from one another but being in close contact with the core strand.

2. A reinforcing metal cord as in claim 1, characterized in that the strand forming the central core is constituted by metal wires whose diameter is of the same order as that of the wires of the strands forming the outer layer.

3. A reinforcing metal cord as in claim 1, characterized in that the strand forming the central core is constituted by metal wires whose diameter is smaller than that of the wires of the strands forming the outer layer.

References Cited

UNITED STATES PATENTS

| | | | |
|---|---|---|---|
| 2,567,300 | 9/1951 | Riddle | 57—148 |
| 2,900,785 | 8/1959 | Fenner | 57—149X |
| 3,018,606 | 1/1962 | Dietz | 57—148 |
| 3,092,956 | 6/1963 | Naysmith | 57—145 |
| 3,181,291 | 5/1965 | Carpenter | 57—148 |
| 3,195,299 | 7/1965 | Dietz | 57—149 |
| 3,306,022 | 2/1967 | Stevens | 57—148 |
| 3,336,744 | 8/1967 | Peene | 57—145 |

JOHN PETRAKES, Primary Examiner

U.S. Cl. X.R.

57—139